Dec. 16, 1924.

H. REHBEIN

HOOK LINK

Filed March 6, 1924

1,519,931

INVENTOR.
H. Rehbein,
BY
Geo. P. Kimmel
ATTORNEY.

Patented Dec. 16, 1924.

1,519,931

UNITED STATES PATENT OFFICE.

HERMAN REHBEIN, OF MISHICOT, WISCONSIN.

HOOK LINK.

Application filed March 6, 1924. Serial No. 697,278.

*To all whom it may concern:*

Be it known that I, HERMAN REHBEIN, a citizen of the United States, residing at Mishicot, in the county of Manitowoc and State of Wisconsin, have invented certain new and useful Improvements in Hook Links, of which the following is a specification.

This invention relates to a hook link designed primarily for use in conveyor chains traveling along the bed of a feed cutter, but it is to be understood that a hook link in accordance with this invention can be interposed in conveyor chains employed for other purposes than that in connection with feed cutters, and the invention has for its object to provide, in a manner as hereinafter set forth, a reinforced hook link constructed, to afford more clearance and to obtain satisfactory engagement with the sprocket than that obtained in the type of link now generally used for the same purpose which a hook link in accordance with this invention is employed, and further providing a hook link capable of being used in a position reverse to the position of links now used in conveyor chains for feed cutters.

Further objects of the invention are to provide a hook link, in a manner as hereinafter set forth, which is simple in its construction, strong, durable, compact, thoroughly efficient in its use, of one casting, and inexpensive to manufacture.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
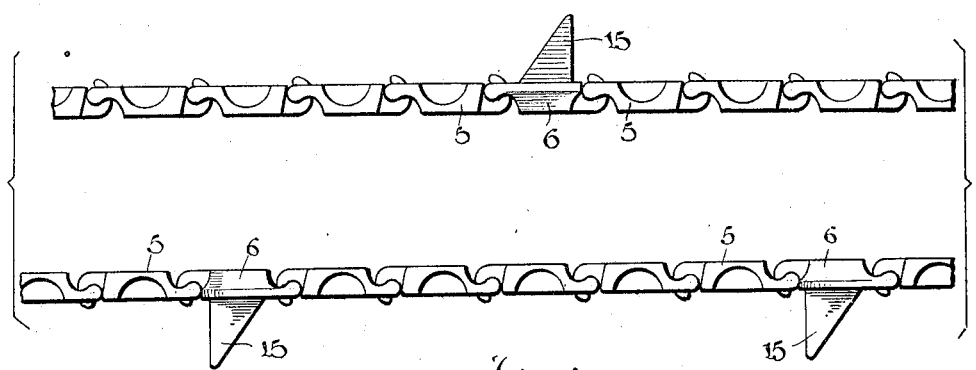
Figure 1 is a fragmentary view of a conveyor chain, showing the adaptation therewith of a plurality of hook links in accordance with this invention.

Referring to Figure 1 of the drawings, 5 denotes a series of interengaging chain links having interposed therein a pair of hook links in accordance with this invention and which are referred to generally by the reference character 6.

Figure 2:
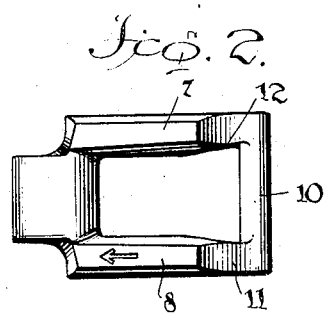
Figure 2 is a plan of the hook link.
Figure 3:
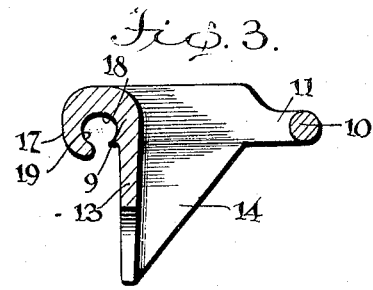
Figure 3 is a longitudinal sectional view thereof.
Figure 4:
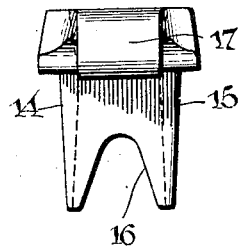
Figure 4 is an end elevation of the hook link.

In Figures 2, 3 and 4 of the drawings, which illustrate the hook link, in accordance with this invention, the said hook link comprises a body portion in the form of a frame consisting of a pair of side bars 7, 8, and a pair of end bars 9, 10.

Each of the side bars 7, 8 has a reduced terminal portion 11 and the ends of the said reduced terminal portion 11 are formed integral with the end bar 10, which is cylindrical in contour.

The reduced end terminal portion 11 of the side bar is of a length less than half of the bar, and of a height substantially equal to half of the height of the remaining portion of the bar.

The end bar 9, is formed integral with the ends of the portions of greater height of the side bars 7, 8, and said bar 9 is of a height equal to the height of the higher portions of the side bars 7 and 8.

The side bars 7 and 8 are of greater length than the end bars 9 and 10 whereby the frame which forms the body portion of the link will be rectangular in contour.

In vertical section, the higher portion of each of the side bars 7 and 8, has the lower part squared and the upper part tapered. The tapered part is of greater height than the squared part.

The inner face of the reduced terminal portion 11, of each side bar, is bevelled downwardly and outwardly as at 12. The bevelled inner faces of the reduced terminal portions 11 extend in opposite directions with respect to each other.

The hook which is integral with and extends from the body portion, as well as being flush with the inner face thereof, comprises a rectangular front piece 13 and a pair of triangular side pieces 14 and 15.

The front piece 13 is vertically disposed. The side pieces 14 and 15, as well as the front piece 13 are of the same length, and each of the said pieces is of a length substantial for the purpose for which the hook is intended. The front piece 13 is formed integral with the side pieces 14 and 15 and said front piece at its outer portion is formed with a V-shaped notch 16.

The front piece 13 is of less thickness than the thickness of the end bar 9. The side piece 14 is of less thickness than the thickness of the side bar 7, and the side piece 15 is of less thickness than the thickness of the side bar 8. The inner face of the front bar 13 is flush with the inner face of the end bar 9 and said front piece 13 is furthermore formed integral with the said end bar 9. The side piece 14 is flush with the inner face of the side bar 7 and further is formed integral with said side bar 7. The side piece 15 is flush with the inner face of the side bar 8 and further is formed integral with said side bar 8. The side pieces 14 and 15 gradually decrease in thickness from the side bars 7 and 8.

Formed integral with the outer face of the end bar 9 and projecting therefrom, is a curved extension 17, which constitutes a coupling member for attaching the hook link to a link 5, as shown in Figure 1. The outer face of the end bar 9 is curved as at 18 and which forms a continuation of the curved inner face 19 of the arm 17. The arm 17 is of less width than the length of the end bar 9 and is disposed centrally with respect thereto.

What I claim is:

1. A hook link comprising a frame including a pair of side bars each having a reduced rear terminal portion, a cylindrical rear end bar integral with the outer ends of said reduced terminal portions, a front end bar integral with the forward ends of and of the same height as said side bars, a curved coupling arm projecting from the outer face of the front end bar, a hook extended above said arm and formed of a notched rectangular front piece and a pair of triangular shaped side pieces integral with said side and front end bars, said pieces of less thickness than and flush with the inner faces of the side and front end bars.

2. A hook link comprising a frame including a pair of side bars each having a reduced rear terminal portion, a cylindrical rear end bar integral with the outer ends of said reduced terminal portions, a front end bar integral with the forward ends of and of the same height as said side bars, a curved coupling arm projecting from the outer face of the front end bar, a hook extended above said arm and formed of a notched rectangular front piece and a pair of triangular shaped side pieces integral with said side and front end bars, said pieces of less thickness than and flush with the inner faces of the side and front end bars, said front end bar of greater height than said rear end bar.

3. A hook link comprising a frame including a pair of side bars each having a reduced rear terminal portion, a cylindrical rear end bar integral with the outer ends of said reduced terminal portions, a front end bar integral with the forward ends of and of the same height as said side bars, a curved coupling arm projecting from the outer face of the front end bar, a hook extended above said arm and formed of a notched rectangular front piece and a pair of triangular shaped side pieces integral with said side and front end bars, said pieces of less thickness than and flush with the inner faces of the side and front end bars, and the front face of said forward end bar being curved to form a continuation of the inner face of said arm.

4. A hook link comprising a frame including a pair of side bars each having a reduced rear terminal portion, a cylindrical rear end bar integral with the outer ends of said reduced terminal portions, a front end bar integral with the forward ends of and of the same height as said side bars, a curved coupling arm projecting from the outer face of the front end bar, a hook extended above said arm and formed of a notched rectangular front piece and a pair of triangular shaped side pieces integral with said side and front end bars, said pieces of less thickness than and flush with the inner faces of the side and front end bars, the reduced terminal portion of each side bar providing the latter with a portion of greater height, said portion of greater height in vertical section having a squared lower part and a tapered upper part.

5. A hook link comprising a frame including a pair of side bars each having a reduced rear terminal portion, a cylindrical rear end bar integral with the outer ends of said reduced terminal portions, a front end bar integral with the forward ends of and of the same height as said side bars, a curved coupling arm projecting from the outer face of the front end bar, a hook extended above said arm and formed of a notched rectangular front piece and a pair of triangular shaped side pieces integral with said side and front end bars, said pieces of less thickness than and flush with the inner faces of the side and front end bars, the inner face of each reduced terminal portion being downwardly and outwardly bevelled.

6. A hook link comprising a frame including a pair of side bars each having a reduced rear terminal portion, a cylindrical rear end bar integral with the outer ends of said reduced terminal portions, a front end bar integral with the forward ends of and of the same height as said side bars, a curved coupling arm projecting from the outer face of the front end bar, a hook extended above said arm and formed of a notched rectangular front piece and a pair of triangular shaped side pieces integral with said side and front end bars, said pieces of less thickness than and flush with the inner faces of the side and front end bars, said front and side pieces being of a width less than the length of said side and front end bars.

In testimony whereof, I affix my signature hereto.

HERMAN REHBEIN.